(No Model.)
C. E. BUELL.
MEANS FOR UTILIZING SECONDARY BATTERIES ON TELEPHONE CIRCUITS.
No. 255,377. Patented Mar. 21, 1882.
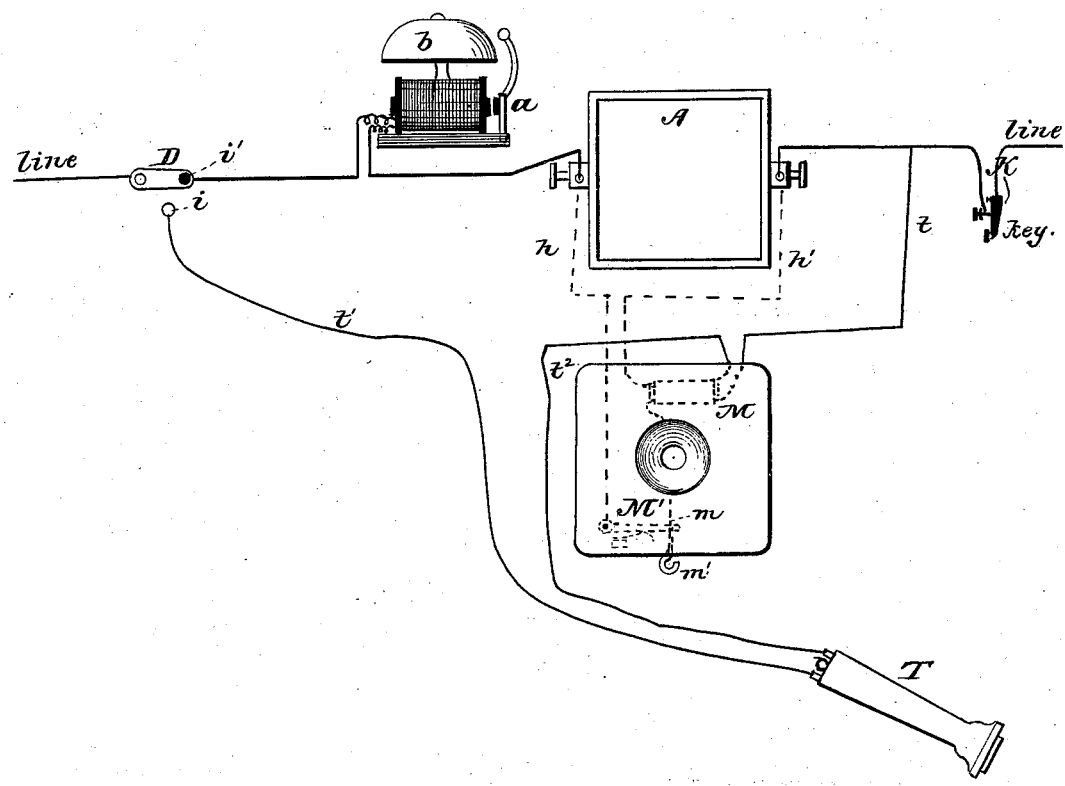
Witnesses:
F. H. Knight
Fred F. Church
Inventor,
Charles E. Buell
By Melville Church,
His Atty.

UNITED STATES PATENT OFFICE.

CHARLES E. BUELL, OF NEW HAVEN, CONNECTICUT, ASSIGNOR OF TWO-THIRDS TO JAMES G. SMITH, OF HACKENSACK, NEW JERSEY, AND GEORGE W. COY, OF MILFORD, CONNECTICUT.

MEANS FOR UTILIZING SECONDARY BATTERIES ON TELEPHONE-CIRCUITS.

SPECIFICATION forming part of Letters Patent No. 255,377, dated March 21, 1882.

Application filed December 3, 1881. (No model.)

*To all whom it may concern:*

Be it known that I, CHARLES E. BUELL, a citizen of the United States, residing at New Haven, in the county of New Haven and State of Connecticut, have invented certain new and useful Improvements in Means for Utilizing Secondary Batteries on Telephone-Circuits; and I do hereby declare the following to be a full, clear, and exact description of the invention, such as will enable others skilled in the art to which it appertains to make and use the same, reference being had to the accompanying drawing, and to the letters and figures of reference marked thereon, which forms a part of this specification.

This invention relates to an improved complete telephone-station apparatus; and it consists, first, in the combination, in a telephone-station apparatus, of a main line, including a call-bell and a secondary battery, a branch circuit, which includes a telephone, and switch devices for excluding said call-bell and secondary pile or battery from said main line and for completing said main-line circuit through the telephone-circuit; secondly, in the combination, in a telephone-station apparatus, of a main line, including a call-bell, a secondary pile or battery, and means for signaling to a remote or distant station; and, thirdly, in the combination, in a telephone-station apparatus, of a main line, which includes a secondary battery, an independent branch circuit, which includes the secondary coil of a telephone-transmitter, induction apparatus, a normally-open sub-circuit, which includes the secondary battery and the primary coil of the induction apparatus, switch devices for excluding the secondary battery from the main line and for completing the main line through the branch circuit containing the secondary coil, and switch devices for closing the sub-circuit prior to sending or receiving a message.

In the accompanying drawing, the figure illustrates a telephone-station apparatus arranged in accordance with my invention.

The letter A indicates a secondary electrical pile or battery, which may be of any well-known or suitable construction, and having its opposite poles connected with the main line, as shown in full lines in the drawing, and also with the primary coil of the induction-coil or inductorium of the transmitter M by means of wires $h$ $h'$, (shown by dotted lines.)

A metallic spring, M', (shown in dotted lines as arranged within the transmitter-case,) is interposed in the primary circuit of the induction-coil, and will, when left free, close said circuit by making contact with a metallic stop, $m$, connected with a wire leading from one of the contact devices, which is controlled by the transmitter-diaphragm; but when the telephone T is hung upon the hook $m'$, which projects through the bottom of the casing from said spring-arm, the weight of the telephone will depress the arm, and thus break the circuit.

The secondary coil of the transmitter connects with the main line on one side of the secondary pile A by means of a wire, $t$, and it is connected with one terminal of the coil of the receiver T by a wire, $t^2$, while a wire, $t'$, leads from the other terminal of the receiver-coil to a contact-plate or switch-point, $i$.

The switch D is connected with the incoming line terminal, and may be placed in contact with either the plate or point $i$ or a similar plate, $i'$, and when in contact with the latter completes the main-line circuit through a call-bell, $a$ $b$, and the secondary pile A, as shown. Thus it will be seen that when the main-line circuit is so completed, and the primary circuit of the transmitter is broken by the telephone holding M' depressed, the main-line battery-current will have no other path through the station than through the secondary pile A and the bell-magnet. This being its normal course, said current acts constantly, when the station-telephones are not in use at a particular station, to charge the secondary pile at the station. When, however, the telephone T is removed from its hook and the arm M' rises, closing the primary circuit, and the switch D is swung into contact with point $i$, the charge of the secondary pile A flows from one pole to the other over the wires $h$ $h'$ and primary circuit, and the main-line circuit is closed over the station-telephone circuit, as before described. When the transmitter-diaphragm is now actuated by sound vibrations in the usual manner in oral communication the variations caused thereby in the primary circuit produce the induced electrical waves, which traverse the line and act upon a receiver at a connected station.

The secondary pile A will ordinarily, after being fully charged, work efficiently for about an hour.

A push-button, K, or other contrivance, is provided for breaking the circuit for calling a remote station.

In another application filed by me June 6, 1881, I have substantially claimed—

"1. A telephone-station apparatus provided with a transmitter having its secondary circuit arranged for connection with a main line, a secondary electric pile or battery arranged for connection with a main line in a manner to become charged by an electric current flowing over said main line, and means for directing the current of said secondary electric pile or battery over the primary circuit of the transmitter.

"2. A line-wire provided at one end with a line-battery or electric-current generator, in combination with a secondary cell arranged upon said line and adapted to store up electricity upon the passage of the main-line current through it, a local circuit in circuit with said secondary cell, and a transmitter in said local circuit."

This matter so claimed in my other application I therefore make no claim to here.

What I do claim herein, however, is—

1. The combination, in a telephone-station apparatus, of a main line, including a call-bell and a secondary battery, a branch circuit, which includes a telephone, and switch devices for excluding said call-bell and secondary pile or battery from said main line and completing the main-line circuit through the telephone branch circuit, substantially as described.

2. The combination, in a telephone-station apparatus, of a main line, including a call-bell, a secondary pile or battery, and means for signaling to a remote or distant station, substantially as described.

3. The combination, in a telephone-station apparatus, of the following elements, viz: a main line, which includes a secondary battery, an independent branch circuit, which includes the secondary coil of an induction apparatus of a telephonic transmitter, a sub-circuit normally held open by the weight of the telephone, which circuit includes the secondary battery and the primary coil of said induction apparatus, switch devices for excluding the secondary battery from the main line and completing the main line through the branch circuit, which includes the secondary coil of the transmitter, and switch devices for completing the sub-circuit when the telephone is removed from its support, substantially as described.

CHAS. E. BUELL.

Witnesses:
FRED F. CHURCH,
MELVILLE CHURCH.